July 19, 1938.    L. O. GRANGE    2,124,345
ADJUSTABLE RIM
Filed Feb. 8, 1937    2 Sheets-Sheet 1

Inventor
Leo O. Grange
By Ralph Barrow
Attorney

July 19, 1938.  L. O. GRANGE  2,124,345
ADJUSTABLE RIM
Filed Feb. 8, 1937  2 Sheets-Sheet 2
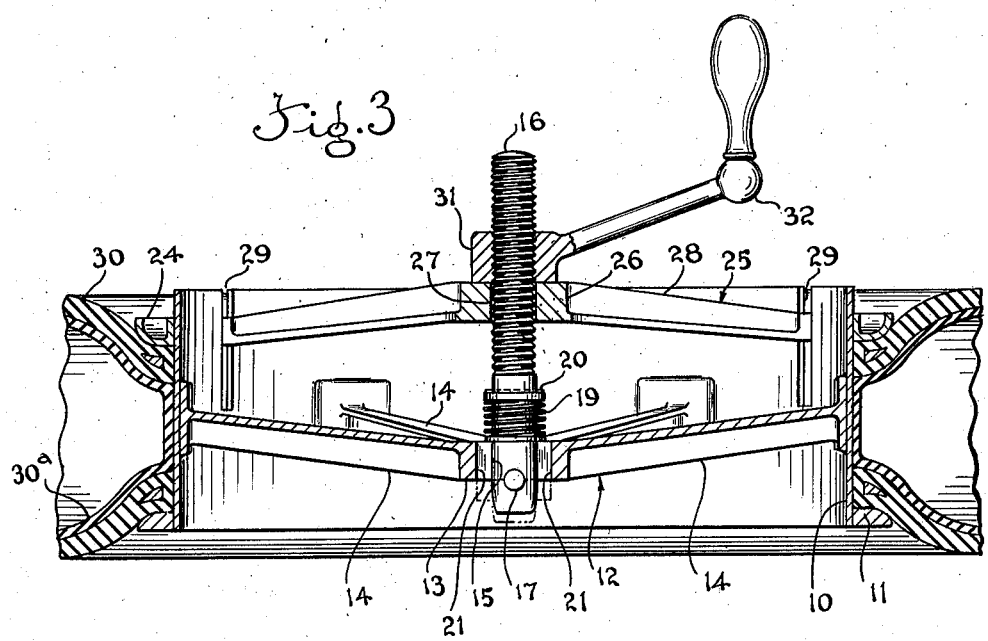
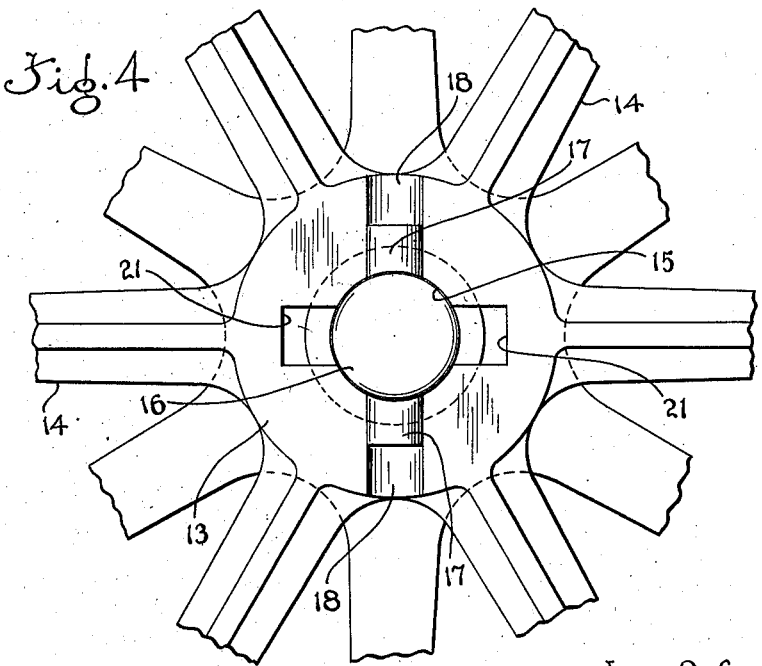
Inventor
Leo O. Grange
By Ralph Barrow
Attorney Patented July 19, 1938

2,124,345

UNITED STATES PATENT OFFICE 2,124,345

ADJUSTABLE RIM

Leo O. Grange, Chicago, Ill., assignor to Safety Vulcanizer Company, Chicago, Ill., a corporation of Illinois Application February 8, 1937, Serial No. 124,710

5 Claims. (Cl. 18—18)

This invention relates to adjustable rims for supporting various sizes of pneumatic tires.

One object of the invention is to provide an adjustable rim of the character described whereby the tires may be easily and quickly mounted and dismounted.

Another object of the invention is to provide an adjustable rim in which the adjustability for different rim widths is obtained by virtue of a single central adjustment means.

These and other objects of the invention are attained by means of the adjustable rim illustrated in the accompanying drawings and described below. It is understood that the invention is not limited to the specific form thereof shown and described.

Of the accompanying drawings.

Figure 3 is a cross-section of the rim with an expanded tire mounted therein, portions of the tire being broken away.

Figure 4 is an enlarged fragmentary view of the fixed hub of the rim as viewed from the under side of Figure 3.

Figure 1:
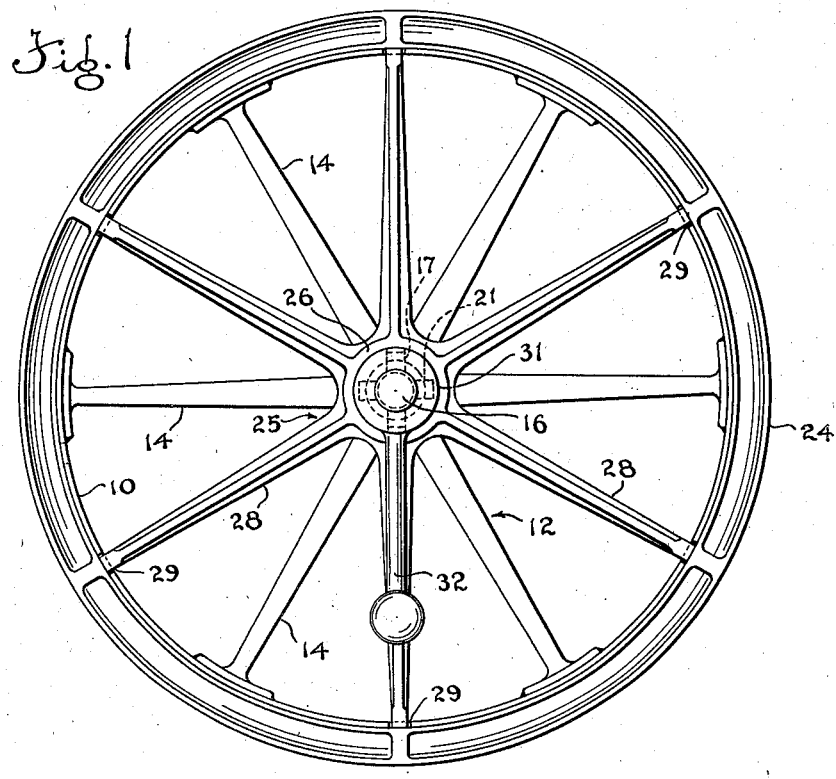
Figure 1 is a plan view of an adjustable rim embodying the invention.
Figure 2:
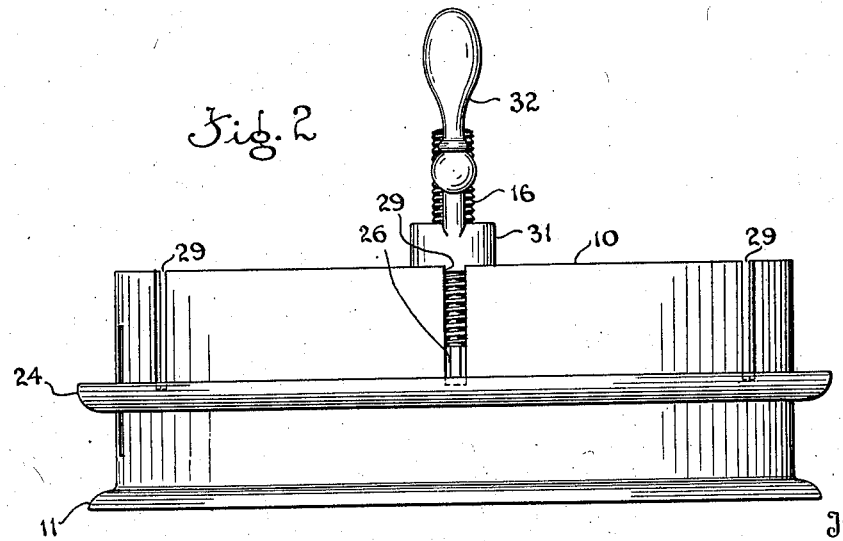
Figure 2 is a front elevation thereof.

Referring to the drawings, 10 is a rim base preferably having fixed thereon one bead flange 11. Interiorly of the base 10 there may be a spider 12 comprising a hub portion 13 and spokes 14, 14 extending therefrom to a rigid connection with the inner periphery of said base 10. Removably mounted in a bore 15 in the hub 13 there may be a central shaft 16, provided adjacent one end thereof with projecting pins 17, 17 adapted to be engaged with grooves 18, 18 on the outer face of the hub 13, to prevent rotational movement of the shaft 16 with respect to the hub 13 and to limit movement of the shaft 16 in one direction through the bore 15 in the assembled condition of the rim. Movement of the shaft 16 may be limited in the other direction by means of a spring assembly 19 held in position by a pin 20. The hub 13 may have openings 21, 21 extending therethrough, intermediate the grooves 18, 18, through which the pins 17, 17 may be allowed to pass by urging the shaft 16 against the pressure of the spring 19 sufficiently to release the pins 17, 17 from the grooves 18, 18 and rotating the shaft 16 to a position where the pins 17, 17 may be passed through the openings 21, 21.

Slidably mounted on the outer periphery of the base 10 and guided thereon by engagement of the inner periphery of the bead flange with the outer periphery of the base 10 may be an adjustable bead flange 24, supported on a spider 25 comprising a hub portion 26 having a bore 27, adapted loosely to receive the shaft 16, and having arms 28, 28 extending from the hub 26 to a fixed connection with the adjustable bead flange 24. The arms 28, 28 may be adapted to be slidably received through slots 29, 29 in the base 10 adjacent one margin thereof. The slots 29, 29 may be open at said margin to permit the bead flange 24 to be removed from the rim to facilitate mounting and dismounting the tire 30. There may be provided a nut 31, having an operating handle 32 thereon, for the purpose of retaining the bead flange 24 on the rim base 10 as well as to provide a central adjusting means when the tire 30 is mounted on the rim.

In mounting a tire of any desired bead width on the rim, the bead flange 24 is first removed from the rim assembly. This is accomplished by urging the shaft 16 against the action of spring 19 sufficiently to release the pins 17, 17 from the grooves 18, 18 and allow said shaft to be rotated until the pins 17, 17 may be passed through the openings 21, 21, thus enabling the operator to remove the shaft 16 with the spider 25 and nut 31 thereon. After a deflated tire 30, with a pneumatic tube or bag 30ª therein, has been placed in position on the rim base 10, the shaft 16 with the spider 25 and the nut 31 mounted thereon has its end adjacent the pins 17, 17 inserted in the bore 15 in the hub 13 in such a manner that the pins 17, 17 coincide with the openings 21, 21. In this position the shaft 16 may be urged against the spring 19 until the pins 17, 17 are free on the outer side of the hub 13, when the shaft 16 may be rotated a quarter turn to allow the pins 17, 17 to come to rest in the grooves 18, 18. The pins 17, 17 are then held in position in the grooves 18, 18 by the action of the spring 19 and prevent further rotation of the shaft 16. In placing the shaft 16 in this position the nut 31 may be backed off a sufficient distance from the hub 26 of the spider 25 to permit shaft 16 to be urged to the position shown in chain-dotted lines in Figure 3.

With the tire 30 on the rim the removable and adjustable bead flange 24 may be adjusted to space the rim flanges the required distance apart for the tire being mounted, the adjusting nut 31 being turned against the hub 26. The proper pressure is applied to the tire to inflate the same on the adjusted rim. In this condition the complete assembly is ready for use.

From the foregoing brief description of the adjustable rim and the operation thereof it is apparent that the mounting and dismounting of tires for the aforementioned purposes may be accomplished with a rapidity that is very desirable, the adjustability of the rim being controlled at a single central point obviating manipulation of a plurality of nuts as has been required in the past.

The improved rim is useful for many purposes, e. g. in mounting various tires while being repaired, being used in place of standard rims in certain types of repair vulcanizers. It is also useful for mounting various tires for display, demonstration, or other purposes.

Modifications of the invention may be resorted to without departing from the spirit thereof or the scope of the appended claims.

What is claimed is:

1. A supporting rim structure for pneumatic tires comprising a rim base having a flange at one side thereof and a central spider provided with a hub, an axially adjustable and removable flange at the other side of said rim base and slidable upon and guided by said rim base, said last-named flange being carried by a supporting central spider having a hub, a shaft extended through the hub on said rim spider and the hub on said flange spider, means for releasably securing said shaft to said rim spider whereby the rim flange and its supporting spider may be removed from the rim base, and a nut threaded on said shaft for retaining said flange spider on said shaft at various axial positions.

2. A supporting rim structure for pneumatic tires comprising a rim base having a flange at one side thereof and a central spider provided with a hub, an axially adjustable and removable flange at the other side of said rim base and slidable upon and guided by said rim base, said last-named flange being carried by a supporting central spider having a hub, a shaft extended through the hub on said rim spider and the hub on said flange spider, means for releasably securing said shaft to said rim spider whereby the rim flange and its supporting spider may be removed from the rim base, and a nut threaded on said shaft for retaining said flange spider on said shaft at various axial positions, said rim base having axially extending slots therein at said other side thereof and the arms of said flange spider extending through said slots.

3. A supporting rim structure for pneumatic tires comprising a rim base having a flange at one side thereof and a central spider provided with a hub, an axially adjustable and removable flange at the other side of said rim base and slidable upon and guided by said rim base, said last-named flange being carried by a supporting central spider having a hub, a shaft extended through the hub on said rim spider and the hub on said flange spider, means for releasably securing said shaft to said rim spider whereby said rim flange may be quickly removed with its spider to permit mounting or dismounting of a tire on the rim, and a nut threaded on said shaft for retaining said flange spider on said shaft at various axial positions, said releasable securing means comprising a bayonet type releasable interlocking connection between the shaft and the rim spider.

4. A supporting rim structure for pneumatic tires comprising a rim base having a flange at one side thereof and a central spider provided with a hub, an axially adjustable and removable flange at the other side of said rim base and slidable upon and guided by said rim base, said last-named flange being carried by a supporting central spider having a hub, a shaft extended through the hub on said rim spider and the hub on said flange spider, means for releasably securing said shaft to said rim spider whereby said rim flange may be quickly removed with its spider to permit mounting or dismounting of a tire on the rim, and a nut threaded on said shaft for retaining said flange spider on said shaft at various axial positions, said releasable securing means comprising a bayonet type releasable interlocking connection between the shaft and the rim spider, said shaft having bayonet pins thereon and said rim spider hub having bayonet slots therethrough permitting passage of said pins in one position of the shaft, and said rim spider hub having notches thereon to be engaged by said pins when in locked engagement, and means for yieldingly urging said shaft and said rim spider axially of each other to hold said pins in said notches.

5. The combination in a pneumatic tire supporting rim structure, of a rim having a central spider, an axially adjustable flange for said rim slidable upon and guided by said rim and also having a central spider, a shaft for mounting said spiders, means for releasably securing the shaft to one spider, whereby the adjustable flange may be completely removed from said rim with its supporting spider, and means for retaining the other spider on said shaft in various positions of axial adjustment thereon.

LEO O. GRANGE.